(12) United States Patent
Lin et al.

(10) Patent No.: US 11,841,298 B2
(45) Date of Patent: Dec. 12, 2023

(54) COLLECTOR FOR COLLECTING PARTICLES IN AIR AND A DEVICE FOR DETECTING PARTICLES IN AIR

(71) Applicant: IMEC VZW, Leuven (BE)

(72) Inventors: Ziduo Lin, Heverlee (BE); Abdulkadir Yurt, Heverlee (BE); Richard Stahl, Rotselaar (BE); Geert Vanmeerbeeck, Keerbergen (BE); Andy Lambrechts, Herent (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 17/127,972

(22) Filed: Dec. 18, 2020

(65) Prior Publication Data

US 2021/0190670 A1 Jun. 24, 2021

(30) Foreign Application Priority Data

Dec. 20, 2019 (EP) ..................................... 19218696

(51) Int. Cl.
*G01N 1/22* (2006.01)
*G01N 15/14* (2006.01)
(Continued)

(52) U.S. Cl.
CPC ........... *G01N 1/22* (2013.01); *G01N 15/0612* (2013.01); *G01N 15/1463* (2013.01);
(Continued)

(58) Field of Classification Search
None
See application file for complete search history.

(56) References Cited

U.S. PATENT DOCUMENTS 5,085,937 A * 2/1992 Herauf .................. G01N 1/02
428/41.5
6,023,982 A * 2/2000 Basch .................. G01N 1/2273
73/863.25
(Continued)

FOREIGN PATENT DOCUMENTS

DE 102017008875 B3 * 12/2017 ............. B64C 27/08
WO WO-2018/118934 A1 6/2018
WO WO-2018/165590 A1 9/2018

OTHER PUBLICATIONS

Sharma et al., "High vol. electrostatic field-sampler for collection of fine particle bulk samples, Atmospheric Environment", vol. 41, Issue 2, pp. 369-381, https://doi.org/10.1016/j.atmosenv.2006.07.034, Jan. 2007.
(Continued)

*Primary Examiner* — Michael A Lyons
(74) *Attorney, Agent, or Firm* — MOSER TABOADA (57) ABSTRACT

The inventive concept relates to a collector for collecting particles in air and a device for detecting particles in air comprising said collector. Said collector comprises a substrate, which is adapted to enable imaging of the particles, an adhesive layer arranged on a collector side of the substrate, said adhesive layer being formed by an adhesive material. The collector further comprises a protection element, which is configured to protect the adhesive layer before collection of particles. The collector is configured to allow release of protection of the adhesive layer by the protection element to expose an adhesive surface of the adhesive layer to ambient air for collecting particles on the adhesive surface. The collector is further configured for presenting a particle sample carrier having a smooth top surface and a smooth bottom surface for preventing light from being diffusely scattered by the particle sample carrier.

9 Claims, 5 Drawing Sheets

(51) Int. Cl.
  *G01N 15/06* (2006.01)
  *G01N 1/28* (2006.01)
  *G01N 15/02* (2006.01)
(52) U.S. Cl.
  CPC ............... *G01N 2001/2223* (2013.01); *G01N 2001/2276* (2013.01); *G01N 2001/2833* (2013.01); *G01N 2015/0233* (2013.01)

(56) References Cited

U.S. PATENT DOCUMENTS

| | | | |
|---|---|---|---|
| 6,923,848 B2 | 8/2005 | Totoki | |
| 8,167,986 B2 | 5/2012 | Schneider et al. | |
| 8,372,183 B2 | 2/2013 | Doucette et al. | |
| 9,250,162 B2 | 2/2016 | Braden et al. | |
| 2003/0136205 A1* | 7/2003 | Totoki ..................... | B03C 3/47 |
| | | | 73/864.71 |
| 2017/0315038 A1 | 11/2017 | Kim | |
| 2019/0039076 A1 | 2/2019 | Mainelis et al. | |
| 2019/0293539 A1* | 9/2019 | Manautou .......... | G01N 15/0227 |
| 2019/0346356 A1* | 11/2019 | Karnik ............... | G01N 15/0227 |
| 2020/0132581 A1* | 4/2020 | Li ..................... | G01N 15/0255 |
| 2020/0340901 A1* | 10/2020 | Ozcan ................. | G06T 7/62 |
| 2020/0355597 A1* | 11/2020 | Allan ................... | G02B 21/361 |

OTHER PUBLICATIONS

Doucette et al., "Collection and Detection of Airborne Microorganisms by Combining Electrostatic Precipitation With IR Spectroscopy," in IEEE Sensors Journal, vol. 10, No. 3, pp. 720-727, doi: 10.1109/JSEN.2009.2038570. Mar. 2010.

Kiselev et al., "A flash-lamp based device for fluorescence detection and identification of individual pollen grains", Review of Scientific Instruments 84, 033302; https://doi.org/10.1063/1.4793792, 2013.

Park et al., "Fast Monitoring of Indoor Bioaerosol Concentrations with ATP Bioluminescence Assay Using an Electrostatic Rod-Type SampleR". PLoS ONE 10(5):e0125251. https://doi.org/10.1371/journal.pone.0125251. May 7, 2015.

Crouzy et al., "All-optical automatic pollen identification: Towards an operational system", Atmospheric Environment, vol. 140, pp. 202-212, https://doi.org/10.1016/j.atmosenv.2016.05.062. Sep. 2016.

Takikawa et al., "An Electrostatic-Barrier-Forming Window that Captures Airborne Pollen Grains to Prevent Pollinosis". Int. J. Environ. Res. Public Health, 14, 82. Jan. 2017.

Han et al., "Performance of personal electrostatic bioaerosol sampler (PEBS) when collecting airborne microorganisms", Journal of Aerosol Science, vol. 124, 2018, pp. 54-67, https://doi.org/10.1016/j.jaerosci.2018.07.004. Oct. 2018.

Reiprich et al., "Localized collection of airborne biological hazards for environmental monitoring", Sensors and Actuators B: Chemical, vol. 273. pp. 906-915, https://doi.org/10.1016/j.snb.2018.06.129. Nov. 10, 2018.

Extended European Search Report for Application No. EP 19218696.3, dated Jun. 15, 2020.

Yichen Wu, et al., "Lensless digital holographic microscopy and its applications in biomedicine and environmental monitoring"; Article in Press; Methods 136 (2017); http://dx.doi.org/10.1016/j_ymeth.2017.08.013; pp. 1-13.

Zefon et al.; "Air-O-Cell® Bioaerosol Sampling Cassette—Laboratory & User Manual"; Jun. 19, 2011; Retrieved from the Internet: URL:https://www.emlab.com/m/store/Air-O-Cell%20Instructions.pdf [retrieved on Mar. 1, 2023].

European Office Action for Application No. 19218696.3 dated Mar. 15, 2023.

Cui, et al., "Lensless high-resolution on-chip optofluidic microscopes for *Caenorhabditis elegans* and cell imaging", PNAS, Aug. 5, 2008, vol. 105, No. 31, 10670-10675.

* cited by examiner

FIG. 6 a substantially flat surface onto which the adhesive material may be arranged. By way of example, the material may be, but is not limited to, glass or plastic. The material may be transparent, partly transparent, or opaque.

COLLECTOR FOR COLLECTING PARTICLES IN AIR AND A DEVICE FOR DETECTING PARTICLES IN AIR

CROSS-REFERENCE TO RELATED APPLICATIONS

The present application is based on priority claimed on European Patent Application No. 19218696.3, filed on Dec. 20, 2019, the contents of which are incorporated herein by reference.

TECHNICAL FIELD

The present inventive concept generally relates to detection of particles in air, and in particular to a collector for collecting particles and a device for detecting particles in air in which said collector is utilized.

BACKGROUND

Interior and exterior air quality is of increasing interest globally. In some instances, monitoring exterior air quality of pollens or dust, or other pollutants is of great interest. Interior air quality, including the presence of molds, fungi, pollen, dust, or living organisms, such as bacteria, is also of growing interest. For example, allergic reactions to air-born pollen is an increasing problem. Therefore, pollen measurements are being carried out and reported, e.g. together with weather reports.

Pollen may be collected using e.g. Hirst samplers or Bertin Coriolis air samplers. Hirst Sampler use an adhesive tape to capture pollen from the air while Bertin Coriolis air samplers transfer pollen to a liquid. In both cases the samples are then manually removed and analyzed, e.g. using standard optical microscopy.

Due to the way the information is obtained, and the manual efforts required to analyze measurements, there is currently a significant delay in acquiring pollen information. Moreover, the number of measurement locations is limited due to the high cost of pollen measurement equipment.

Having technology to drastically increase the amount of compact pollen measurement stations at a low cost but with the ability to execute fully automated measurements at a higher frequency (e.g. several times per day) would have the potential of providing more up-to-date and geographically more precise information on pollen levels in the air. This information would be valuable to people that are affected by pollen allergies, as it could be used on a much more local scale and specific for every individual as an indicator to reduce the consumption of antihistamine and thereby reducing the side-effects of these drugs, such as sedation, drowsiness, and insomnia.

Automated aerosol particle detectors have been developed, as reviewed by Kiselev et al. [Review of Scientific Instruments 84, 033302 (2013)]. Such particle detectors suck in ambient air, including aerosols, and expel the air through a special nozzle. Various light sources are focused at the nozzle outlet. As an aerosol in the flow passes the focal point of the light, it is recognized by the concomitant scattering detected by two photomultiplier tubes equipped with tailored bandpass filters. In addition to light scattering detection, the automated aerosol particle detectors may furthermore detect a fluorescence signal. Although present automated aerosol particle detectors are fully functional, there is still room for improvement.

In terms of monitoring interior air quality with respect to bacteria, for example, the current art requires physical sample collection of a collection device (i.e. Petri dish with a media conducive to bacterial growth) that is placed in an environment and exposed for a given time duration, collected and viewed under a lens (microscope) using standard optical microscopy by a skilled technician, for example.

SUMMARY

In view of the above, an objective of the present inventive concept is to provide a collector for collecting particles in air and a device for detecting particles in air. It is a further objective to facilitate that particles may be determined as particles of interest (e.g. pollen or bacteria) and still allow a high measurement frequency and with a potential of performing automated measurements—including classification or determination of the type of particle collected, yet provided in compact and low-cost solutions. The collector and the device are hereinafter primarily described as a collector and a device for detecting pollen in air. However, it should be understood that the collector and the device may also be used for detecting other types of particles, e.g. mold, fungi, bacteria, dust, dirt, soot, or smoke.

These and other objectives are at least partly met by the invention as defined in the independent claims. Preferred embodiments are set out in the dependent claims.

According to a first aspect of the present inventive concept there is provided a collector for collecting particles in air, said collector comprising:

a substrate, which is adapted to enable imaging of the particles;

an adhesive layer arranged on a collector side of the substrate, said adhesive layer being formed by an adhesive material;

a protection element, which is configured to protect the adhesive layer before collection of particles;

wherein the collector is configured to allow release of protection of the adhesive layer by the protection element to expose an adhesive surface of the adhesive layer to ambient air for collecting particles on the adhesive surface; and wherein the collector is further configured for presenting a particle sample carrier having a smooth top surface and a smooth bottom surface for preventing light from being diffusely scattered by the particle sample carrier.

It should be understood that the "particles" referred to in the present disclosure may be pollen, but may also be any other type of air-borne particulate matter such as soot, air-borne bacteria, or fungi.

The "substrate" may be made of either a rigid material or a flexible material, extending in a longitudinal direction creating a substantially flat surface onto which the adhesive material may be arranged. By way of example, the material may be, but is not limited to, glass or plastic. The material may be transparent, partly transparent, or opaque.

In the present disclosure, the term "transparent" refers to the physical material property of allowing light to pass through the material without being substantially scattered, either at one or both surfaces of the material or when passing through the material, such that it is possible to see clearly through the material. In some embodiments, the transparency may be substantially uniform over the spectrum of visible light, such that colors viewed through the transparent material are essentially unaltered. Alternatively, the transparency may vary as a function of light wavelength over the visible part of the spectrum, such that the view through the transparent material is tinted in one or more colors.

By the term "collector" is here meant any unit, device or element comprising features for capturing air-borne particles from the ambient air, and collecting the captured particles on a surface of the collector. The substrate of the collector may be configured as a stand-alone unit, suitable for a single particle collection event. By way of example, the substrate may be in the form of an objective slide, or a similar thin, rectangular plate onto which a particle sample may be collected. A plurality of substrates may be stacked or loaded into a supply magazine of the collector. Alternatively, the substrate may be a part of a larger unit comprising a plurality of sample units for a plurality of particle collection events. Given as a non-limiting example, such sample units may be arranged such that the substrate is in the form of a tape of which different segments function as different sample units, wherein each segment can be used for a single particle collection event. Given as another non-limiting example, such a sample unit may alternatively be arranged such that the substrate is in the form of a rotatable disk comprising a plurality of disk segments, wherein each disk segment comprises a sample unit configured for a single collection event.

By "adhesive material" is here meant any substance that is capable of holding materials together by surface attachment resisting separation. The adhesive material may be either a naturally occurring substance, or synthetic, or a combination thereof. By way of example, the adhesive material may be any type of glue, beeswax, starch, gums or any other type. The adhesive material may be, but is not limited to being, transparent.

In the present disclosure the term "protection element" refers to any unit or element preventing ambient air, and thus also the particles therein, from coming in physical contact with the adhesive layer. By way of a non-limiting example, the protection element may be a protective film arranged on the collector side of the substrate such as to protect the adhesive surface of the adhesive layer from exposure to ambient air. The protective film may be made of, but is not limited to, any plastic material. Given as another non-limiting example, the protection element may be a bottom side of the substrate opposite to the collector side of the substrate, such that when substrates are stacked or rolled, the bottom side of one section of the substrate is arranged on the collector side of another section of the substrate, thereby functioning as a protection element. The protection element prevents the adhesive layer from collecting dust, other particles, or drying out, during for example transportation or otherwise prior to initialization of the particle collection event.

By the phrase "allow release of protection of the adhesive layer by the protection element" is here meant that the protection element is arranged to be displaced with respect to the adhesive layer, such that the protection element after displacement no longer prevents ambient air from coming in physical contact with the adhesive layer, and thus the protection element is no longer protecting the adhesive layer. Given as non-limiting examples, release of protection may be done by removing a protective film, or by pulling out a strip or section of a tape from a roll of tape and thereby exposing the adhesive layer on a section of the tape. By way of example, release of protection may be done by hand or by an automatic mechanism. Release of protection of the adhesive layer by the protection element may be performed as an initiation of a particle collection event.

The collector is further configured for presenting a particle sample carrier having a smooth top surface and a smooth bottom surface. By this is here meant that after the particle collection event is finished, and prior to analysis of the sample, the collector is configured such that it may present, either unaltered or if altered in a certain well-defined way, a sample carrier with smooth top and bottom surfaces. This is for preventing light from being diffusely scattered by the particle sample carrier. Such a property allows for optical diagnostics to be made on or through the sample carrier. It should be understood that the substrate and/or the sample carrier may be opaque or may alternatively be transparent. Further, it should be understood that the adhesive material may be opaque or may alternatively be transparent.

By providing a sample carrier with a smooth top surface and a smooth bottom surface, incident light from the light source may be prevented from being diffusely scattered by the particle sample carrier. In this manner, an important requirement is fulfilled for enabling the use of optical diagnostics such as holographic imaging for analyzing the particles collected in the sample carrier.

In particular, the release of protection of the adhesive layer may create irregularities in the adhesive surface, which irregularities may cause scattering of light. Thanks to the collector being configured for presenting a particle sample carrier having a smooth top surface and a smooth top surface, such irregularities may be avoided.

The smooth top surface may be achieved e.g. by arranging the adhesive layer such that the adhesive surface onto which particles are collected is not affected by the removal of the protection element. According to an alternative, the smooth top surface may be achieved by processing the particle sample carrier before analysis such that the smooth top surface is provided.

Thanks to the particle sample carrier having a smooth top surface and a smooth bottom surface, the particle sample carrier with collected particles is suitable for imaging, e.g. using digital holographic imaging. A special advantage of the sample carrier being able to be used together with digital holographic imaging is that it facilitates both fast and more automated data analysis.

Another advantage is that, since a new substrate or substrate segment is used for every measurement, the particles from a previous measurement are removed with the used sample unit, thus cleaning of the substrate is not required. By the present arrangement a low-cost product for facilitating particle detection may be provided, facilitating automated measurement to be made at a high frequency.

According to a preferred embodiment, the collector may comprise:

a substrate, which is transparent to allow imaging of the particles through the substrate;

an adhesive layer arranged on a collector side of the substrate, said adhesive layer being formed by a transparent adhesive material;

a protection element, which is configured to protect the adhesive layer before collection of particles;

wherein the collector is configured to allow release of protection of the adhesive layer by the protection element to expose an adhesive surface of the adhesive layer to ambient air for collecting particles on the adhesive surface; and wherein the collector is further configured for presenting a transparent particle sample carrier having a smooth top surface and a smooth bottom surface for preventing light from being diffusely scattered by the transparent particle sample carrier.

The present arrangement of a transparent sample carrier having a smooth top and bottom surfaces may allow for in-line holographic imaging to be performed through the sample carrier. An advantage is that in-line holographic imaging may be realized by a simple set-up. Such a set-up may be preferred as an optical measurement method since it may be robust, which is an advantage for measurement equipment that is intended to be placed outdoors and may therefore be exposed to harsh weather conditions. Further advantages are that such a set-up may be small and realized at low cost.

According to an embodiment, the smooth top surface and the smooth bottom surface may each have a Haze value of less than or equal to 5%.

By the present arrangement, good optical quality of the presented particle sample carrier may be ensured, such that it is suitable for use with holographic imaging. For a transparent sample carrier this may ensure that the sample carrier is optically clear, by which is here meant that the sample carrier allows for clear imaging through the sample carrier without introducing imaging artefacts such as diffusion, distortion, or shading.

According to an embodiment, the collector side of the substrate may comprise a recess area surrounded by a protection area, wherein the adhesive layer is arranged in the recess area, and wherein the protection element may be arranged in contact with the protection area of the collector side of the substrate covering the recess area such that the protection element is physically spaced from the adhesive surface.

By the present arrangement a gap is left between the adhesive surface and the protection element, while the adhesive surface may still be covered by the protection element being sealed to the protection area such as to prevent ambient air to enter into the gap. The gap may be filled by encapsulated air, or another gas or gas mixture. The gap may alternatively be evacuated.

An advantage with the embodiment comprising a recess is that the adhesive surface of the adhesive layer may be left untouched even after the protection element has been removed. Hence, if the adhesive layer were arranged such as to have a smooth and clear adhesive surface being prepared for holographic imaging, the smooth and clear surface may remain after removal of the protection element. In embodiments where the protection element is instead in physical contact with the adhesive surface, a surface roughness may be introduced upon removal of the protection element. A surface with a surface roughness may not be suitable for holographic imaging.

According to an embodiment, the collector may further comprise a smoothing device, which is configured to apply a smoothing substrate onto the adhesive surface, after collection of particles on the adhesive surface is completed.

By way of example, application of a smoothing substrate onto the adhesive surface may be realized by placement of the smoothing substrate onto the adhesive surface and subsequently applying a pressure onto the smoothing substrate such that the adhesive layer may attach the smoothing substrate to the substrate of the collector. By way of example, application of a smoothing substrate onto the adhesive surface may be realized by lamination.

An advantage is that the smoothing substrate will ensure that a smooth surface is provided after removal of a protection element on top of an adhesive, even in embodiments in which a surface roughness may be introduced upon removal of the protection element. Another advantage is that by the application of the smoothing substrate, the particles may be trapped onto the sample carrier, such that it is safe to move the sample carrier towards the imaging area without risking that the particles are lost.

According to an embodiment, a surface of the smoothing substrate may comprise an adhesive layer being formed by a transparent adhesive material.

By way of example, the smoothing substrate may comprise an adhesive layer such that the adhesive layer of the smoothing substrate may be integrated with the adhesive layer of the collector surface so as to form an optically clear adhesive layer between the substrates. It should be understood that the adhesive layer on the smoothing substrate may be of the same type of adhesive material as the adhesive layer on the substrate of the collector. Alternatively, the adhesive layer on the smoothing substrate may be of a different type of adhesive material that the adhesive layer on the substrate of the collector.

According to an embodiment, the protection element may be a protective film arranged on the collector side of the substrate such as to protect the adhesive surface of the adhesive layer from exposure to ambient air.

It should be understood that the protection element may be in physical contact with the adhesive surface, or alternatively the protection element may be physically spaced from the adhesive surface.

A protective film may be easily removed. Also, a protective film may be very thin such that the substrate with the protective film is compact so as not to require a large space for storing the substrate with protective film before particle collection.

According to an embodiment, the substrate may comprise a bottom side opposite to the collector side, wherein the bottom side is configured to constitute the protection element when the substrate is rolled, or a plurality of substrates are stacked.

An advantage with the present embodiment is that no separate material is required for merely providing the feature of the protection element. In this manner, a sample unit resulting in less waste material may be provided.

According to an embodiment, the substrate may be a tape made of a flexible material having a leading end and a trailing end, and a total tape length extending in a longitudinal direction from the leading end to the trailing end, the tape being wound to a tape roll.

In the present disclosure, the term "tape" refers to a strip of a flexible material. By way of example, the flexible material from which the tape is made, may be, but is not limited to, a plastic material. It should be understood that, in embodiments in which the substrate is a tape, one of the sides of the tape may be provided with an adhesive layer such as to form a plurality of sample units along the longitudinal direction of the tape, to be used for particle collection.

An advantage is that by a roll of tape, a compact unit comprising a plurality of sample units for a plurality of collection events may be provided.

According to an embodiment, the substrate may form a single sample unit configured for a single event of collecting particles on the adhesive surface.

It should be understood that, in embodiments in which the substrate is a single sample unit, one of the sides of the substrate may be provided with an adhesive layer such as to form a single collector. By way of example, the collector may be in the form of an objective slide, or a similar thin, rectangular plate onto which a particle sample may be collected. A plurality of substrates may be stacked or loaded into a supply magazine.

According to an embodiment, the substrate may comprise a rotatable disk comprising a plurality of disk segments, wherein each disk segment comprises a sample unit configured for a single event of collecting particles on the adhesive surface.

It should be understood that the different sample units on the rotatable disk may be distributed radially on the disk or angularly on the disk, or a combination thereof.

According to a second aspect of the present inventive concept there is provided a device for detecting particles in air; said device comprising:

a receiver for receiving a flow of air comprising particles;

a particle sampling chamber configured to receive the flow of air, the particle sampling chamber comprising a collector according to the first aspect of the present inventive concept, wherein the collector is arranged for collecting a set of particles from the flow of air on the adhesive surface of the collector;

a light source configured to illuminate the particles collected on the adhesive surface, such that an interference pattern is formed by interference between light being scattered by the particles and non-scattered light from the light source;

an image sensor comprising a plurality of photo-sensitive elements configured to detect incident light, the image sensor being configured to detect the interference pattern.

By the term "receiver" is here meant any unit, device, or element arranged to allow a flow of air to pass through it, such that a portion of ambient air may flow into the device. By way of example, a receiver may be, but is not limited to, a funnel or an entrance to a flow channel.

By the term "particle sampling chamber" is here meant a space in which the flow of air is received, and in which a substrate is arranged such that at least some of the adhesive surface is exposed to ambient air in the sampling chamber for collecting particles from the air on the adhesive surface. The sampling chamber may be, but is not limited to, a flow channel through which the air may continuously flow, or a chamber separated from the flow such that after the air has been received in the sample chamber, the air may be stationary in the chamber during a period of time for allowing the particles to be captured onto the adhesive surface of the collector.

It should be understood that the light source may be configured to emitted pulsed light. An advantage of using pulsed light may be that motion blur due to object movement during image acquisition may be avoided. Alternatively, the light source may be configured to emit continuous light.

By the term "image sensor" is here meant any light sensor with a plurality of photo-sensitive elements, each configured to detect incident light. Given only as examples, the image sensor may be, but is by no means limited to, a charge-coupled device (CCD) or a complementary metal-oxide-semiconductor (CMOS) image sensor.

The light source and the image sensor are arranged such that the interference pattern formed by interference between light being scattered by the particles and non-scattered light is detected by the image sensor, such that a recording of the captured particles is made by means of digital holographic imaging.

It should be understood that the light source and the image sensor may be arranged such that the particles are illuminated, and the interference pattern is detected inside the sampling chamber. Alternatively, the light source and the image sensor may be arranged such that the illumination of particles and the detection of the interference pattern is carried out outside the sampling chamber. In such a case the sample unit with captured particles needs to be transferred from a particle collection position in the sampling chamber, to an imaging position.

The non-scattered light from the light source may be passed along a common optical path with the light being scattered by the particles. Thus, the interference pattern may be formed within a wavefront passing the particles and the particle sample carrier in a so-called in-line holography set-up. However, according to an alternative, the non-scattered light may be passed along a separate reference light path, which is combined with the light having been scattered by the particles for reaching the image sensor. In such case, the image sensor may be configured to detect light being reflected by the particles or light being transmitted through the particle sample carrier on which the particles are collected.

Effects and features of this second aspect are largely analogous to those described above in connection with the first aspect. Embodiments mentioned in relation to the first aspect are largely compatible with the second aspect.

An advantage of particle capturing in combination with digital holographic imaging is that it facilitates both fast and more automated data analysis. Further, thanks to the use of holographic imaging, analysis of a particle may be performed to determine, for example through the morphology of the particle, a type of particle that is imaged. This may be used for classifying of particles such that differentiation amongst particles of interest and from other particles is enabled.

According to an embodiment, the light source may be configured to emit at least partially coherent light.

By way of example, the light source may be a laser or a light emitting diode (LED) emitting light through a pinhole.

A light source with good coherence may be an advantage as it may provide a clear and distinct interference pattern.

According to an embodiment, the device may further comprise a substrate advancement mechanism configured to transfer the substrate of the collector or a part of the substrate of the collector used for collection of particles, from a particle collection position, and introducing a new substrate of the collector or a new part of the substrate of the collector into the particle collection position for use in collecting a subsequent set of particles.

By "advancement mechanism" is here meant any mechanism configured to eject a sample unit from the particle sampling position after a completed particle collection event, and reloading the particle sampling position with a new, unused sample unit.

An advantage with the advancement mechanism is that it may allow for automated reset of the sampling chamber after each completed particle collection event, without the requirement of human involvement. By the present arrangement, a device for detecting particles in air being able to perform a plurality of measurements at a high frequency and at a low cost, may be provided.

According to an embodiment, the substrate advancement mechanism may be a roll-to-roll mechanism, advancing the tape from a substrate supply roll, through the particle collection position, to a substrate take-up roll.

According to an embodiment, the substrate advancement mechanism may be an eject-and-insert mechanism configured for ejecting a substrate from the particle collection position to a substrate take-up magazine, and to insert a subsequent substrate from a substrate supply magazine, into the particle collection position.

According to an embodiment, the substrate advancement mechanism may be a disk rotation mechanism configured to rotate the rotatable disk such that a disk segment comprising a sample unit is shifted out from the particle collection position and a subsequent disk segment is shifted into the particle collection position.

According to an embodiment, the light source may be arranged at a first side of the sample carrier; and the image sensor may be arranged at a second side of the sample carrier, wherein the second side of the sample carrier is opposite to the first side of the sample carrier;

wherein the light source, the sample carrier and the image sensor may be further arranged to provide a light path from the light source to the image sensor through the sample carrier and through the surface of the sample carrier with the collected set of particles.

According to a present embodiment, the light source and the image sensor may be arranged such that the interference pattern formed by interference between light being scattered by the particles and non-scattered light is detected by the image sensor, such that a recording of the captured particles is made by means of in-line holographic imaging.

An advantage is that in-line holographic imaging may provide a compact measuring setup compared to other holographic imaging measuring setups as the object light, i.e. the light being scattered by the set of particles, and the reference light, i.e. the non-scattered light from the light source, may share the same light path, i.e. through the through the sample carrier.

According to an embodiment, the sample carrier and the imaging sensor may be arranged relative to each other such that a distance from the imaging sensor to the particles collected on the sample carrier may be 20 mm or less, and preferably 10 mm or less.

An advantage with arranging the imaging sensor at a short distance to the particles on the sample carrier is that the set-up may provide a better holographic imaging quality.

According to an embodiment, the device may further comprise a processor configured to perform digital holographic reconstruction on the interference pattern detected by the image sensor to generate an image of the set of particles.

The processor may be arranged internally in the device. Alternatively, the processor may be arranged in an external unit, such that the digital holographic reconstruction may take place elsewhere. Data of the interference patterns detected by the image sensor may be transferred to the processor, either by a wired connection or wirelessly.

It should be understood that when referring to an "image" in the present disclosure, not merely a two-dimensional projection of a three-dimensional object is intended. Rather, it should be seen from a wider point of view in which a holographic reconstruction, being a three-dimensional representation of an object, in this case particles, is also regarded as an image. Further, within the field of digital image processing it is understood by a person skilled in the art that an "image" undergoing processing in e.g. a computer, is not necessarily the visually available representation of the image displayed on screen, but rather it may be the digital representation of the image inside the processor that is being processed. In fact, there is no requirement of providing any display of the image on screen for the processor to be able to carry out the processing of the image. On the contrary, when a processor performs processing of a large amount of images, it is likely to do so without displaying the images on screen. Hence in the present disclosure, included in the term "image" is not only two-dimensional and three-dimensional visually available images, but also digital representations of images inside the processor or a computer memory.

According to an embodiment, the device may be further configured to compare the image of the set of particles to one or more characteristics of particles to identify the particles in the image.

Thus, the device may be configured to automatically identify particles in the image such that the device may also count the particles.

According to an embodiment, the device is further configured to calculate a concentration of particles in the received flow of air based on a counted number of identified particles in the image of the set of particles and a defined particle concentration relation.

By calculating a concentration of particles, it is possible e.g. to automatically provide concentration of pollen in air so as to provide frequent results of pollen concentration.

It should be understood that determining particle concentration may be done by processing a single image, or a plurality of images.

Other objectives, features and advantages of the present inventive concept will appear from the following detailed disclosure, from the attached claims as well as from the drawings.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present invention are described thereinafter according to a preferable embodiment, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

Figure 1:
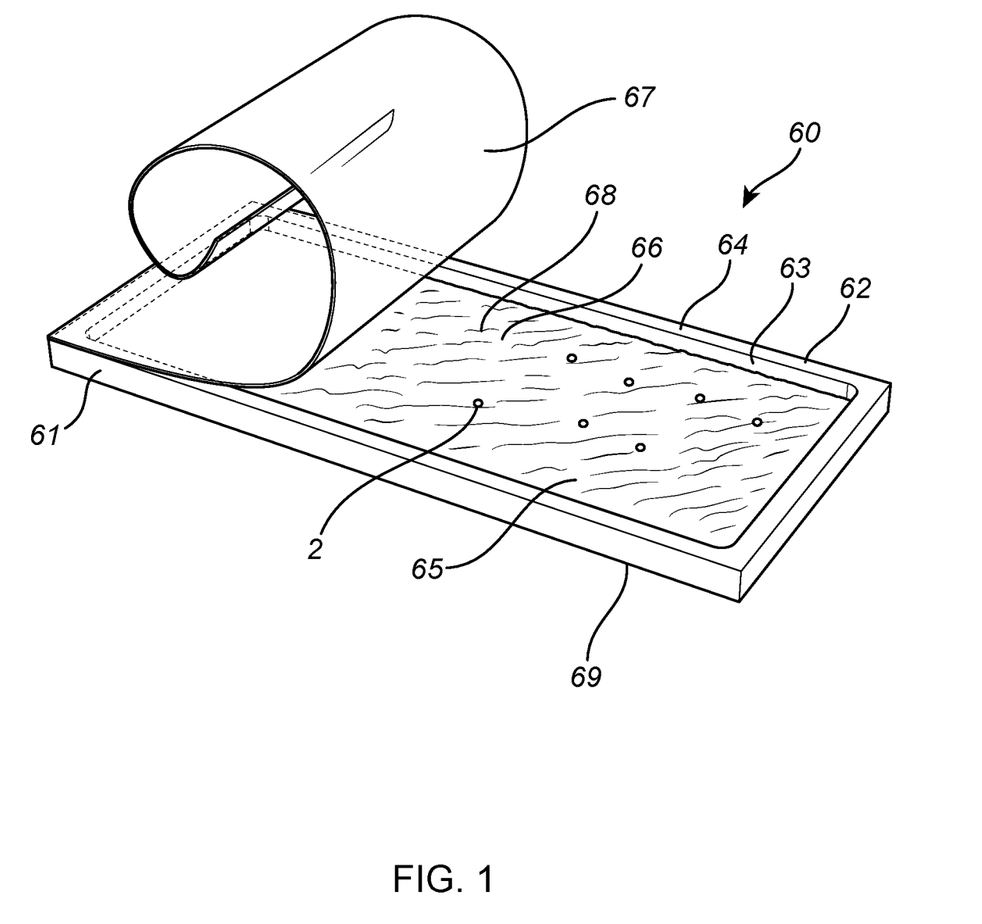
FIG. 1 illustrates an embodiment of a collector for capturing particles in air.

FIG. 1 illustrates a collector 60 for collecting particles 2 in air, according to an embodiment of the inventive concept. The collector 60 comprises a substrate 61 made of a clear, transparent material. On the collector side 62 of the substrate 61 used for collecting particles 2, the substrate 61 is provided with a recess area 63. The recess area 63 is surrounded by a protection area 64 on the collector side 62 of the substrate 61, forming a shallow concave bowl. In the recess area 63, the substrate 61 is provided with an adhesive layer 65, applied in a clear, smooth coating such that the adhesive layer does not completely fill up the recess area. In other words, an adhesive surface 66 of the adhesive layer 65 is arranged to be below the level of the protection area 64 of the substrate 61. It should be understood that the adhesive material may be applied in the recess area 63 only, or alternatively in the recess area 63 as well as on the rest of the collector side 62 of the substrate such that also the protection area 64 is covered by adhesive material. In either case the level of the adhesive surface in the recess area, or at least in a major part of it, should be arranged below the protection area 64 of the substrate 61.

The collector as illustrated in FIG. 1 further comprises a protection element 67 in the form of a thin protective film. The protection element 67 is arranged to cover the recess area 63, and is initially attached to the substrate 61 along the protection area 64 of the collector side 62. In this manner, the recess area 63 is sealed such that ambient air is prevented from entering the recess area 63. This in turn prevents the adhesive layer 65 to dry out, or to collect particles or other impurities from the ambient air, onto the adhesive surface 66 for example during transport of the collector 60 from a production site to a particle measurement site. For illustrative purposes, the protection element 67 as shown in FIG. 1 is half-way removed from the substrate, leaving a portion of the recess area 63 exposed and another portion covered. However, in most situations the protection element is usually either completely covering the recess area 63 or is completely removed.

When arranged to protect the recess area 63, the protective element 67 is stretched such that no excess material of the collector may fall down onto the adhesive surface 66. In this manner, the protection element 67 is physically spaced from the adhesive surface 66, leaving a gap therebetween. Because there is no physical contact between the protection element 67 and the adhesive surface 66, it is ensured that the clear, smooth coating of the adhesive surface 66 may be maintained also upon removal of the protection element 67. In this manner, the collector 60, after removal of the protection element 67, may constitute a particle sample carrier with a smooth top surface 68 and a smooth bottom surface 69 for preventing light from being diffusely scattered by the particle sample carrier. Thus, the particle sample carrier is suited for use of optical diagnostics such as holographic imaging for analyzing the particles collected in the sample carrier.

When the protection element 67 has been removed, the adhesive surface 66 may begin to collect particles 2 from the air above the collector. Particles 2 that come in contact with the adhesive surface 66 may be stuck on the adhesive surface 66, and are thereby collected. Once collected, they may be investigated by holographic imaging.

It should be noted that in FIG. 1 the adhesive surface 66 is illustrated with wavy lines. This is only for illustrative purposes in order to visualize the surface to the reader, but the adhesive surface 66 is in fact a clear, smooth surface, as also stated above.

Figure 2A:
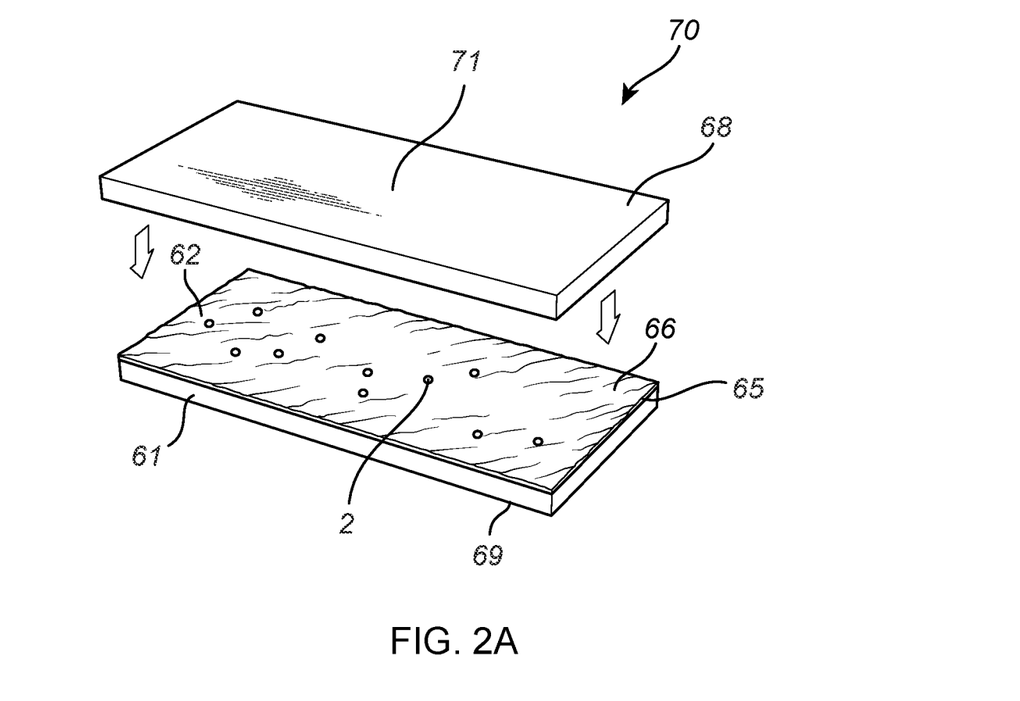
FIGS. 2A to 2B illustrate details of how a sample carrier with a smooth top surface and a smooth bottom surface may be provided, according to two alternative embodiments.

FIG. 2A illustrates details of how a sample carrier 70 with a smooth top surface 68 and a smooth bottom surface 69 may be provided, according to another embodiment of the inventive concept. The substrate 61 comprises an adhesive layer 65, however not in a recess area, but rather directly on the collector side 62 of the substrate 61. In this embodiment, the substrate 61 may not in itself ensure a clear smooth adhesive surface 66, since a protection element such as a protective film (not shown here) placed in direct contact with the adhesive surface 66, may cause roughness of the adhesive surface 66 upon removal of the protective element. In order to restore a smooth top surface 68 so as to provide a sample carrier having a smooth top surface 68 and a smooth bottom surface 69, a smoothing substrate 71 may be added onto the adhesive surface 66 after a particle collection event has been completed. The substrate 61 and the smoothing substrate 71 may be pushed together to ensure that good contact between the smoothing substrate 71 and the adhesive surface 66 is achieved. The collected particles 2 will thus be trapped between the two substrates 61, 71. In this manner, a sample carrier 70 having a smooth top surface 68 and a smooth bottom surface 69 may be provided. Further, as the collected particles 2 are trapped between the two substrates 61, 71, the particles 2 are prevented from falling off, and the sample carrier 70 may therefore be moved without risking loss of particles 2.

Figure 2B:
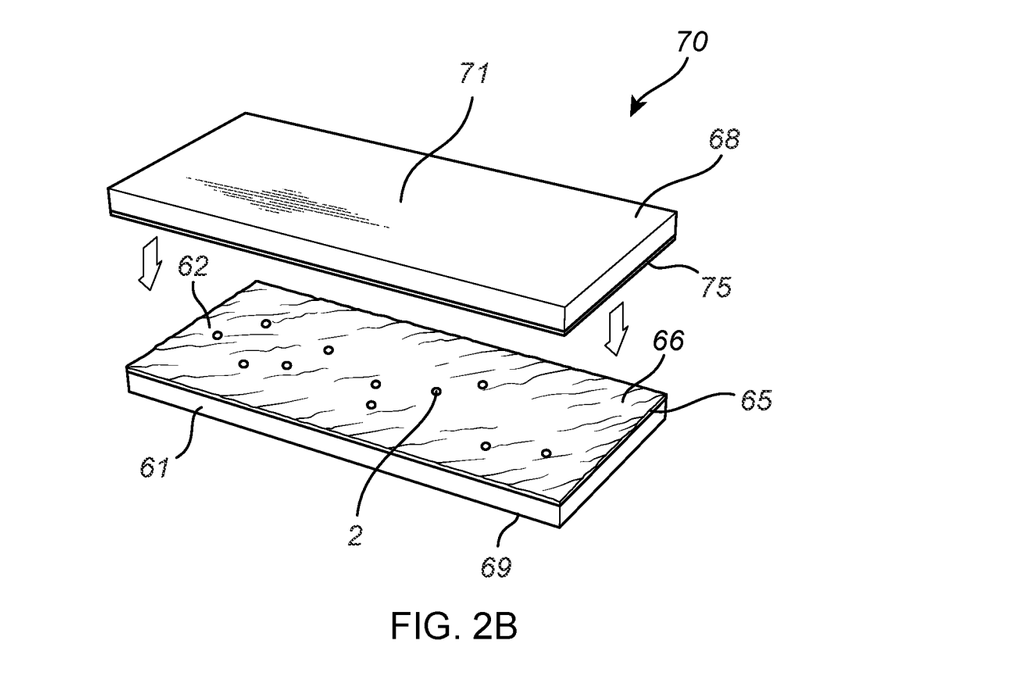

FIG. 2B illustrates an alternative embodiment similar to the embodiment described in FIG. 2A. The difference is that in the embodiment shown in FIG. 2B, the smoothing substrate 71 is provided with an adhesive layer 75. An advantage with this embodiment may be that the two adhesive layers 65, 75 may be configured to merge such that a good contact between the substrates 61, 71 and the adhesive layers 65, 75 is provided. Typically, the adhesive layer 75 of the smoothing substrate 71 is of the same adhesive material as the adhesive layer 65 of the substrate 61. However, it should be understood that the adhesive layer 75 may alternatively be of a different adhesive material that that of the adhesive layer 65.

Figure 3:
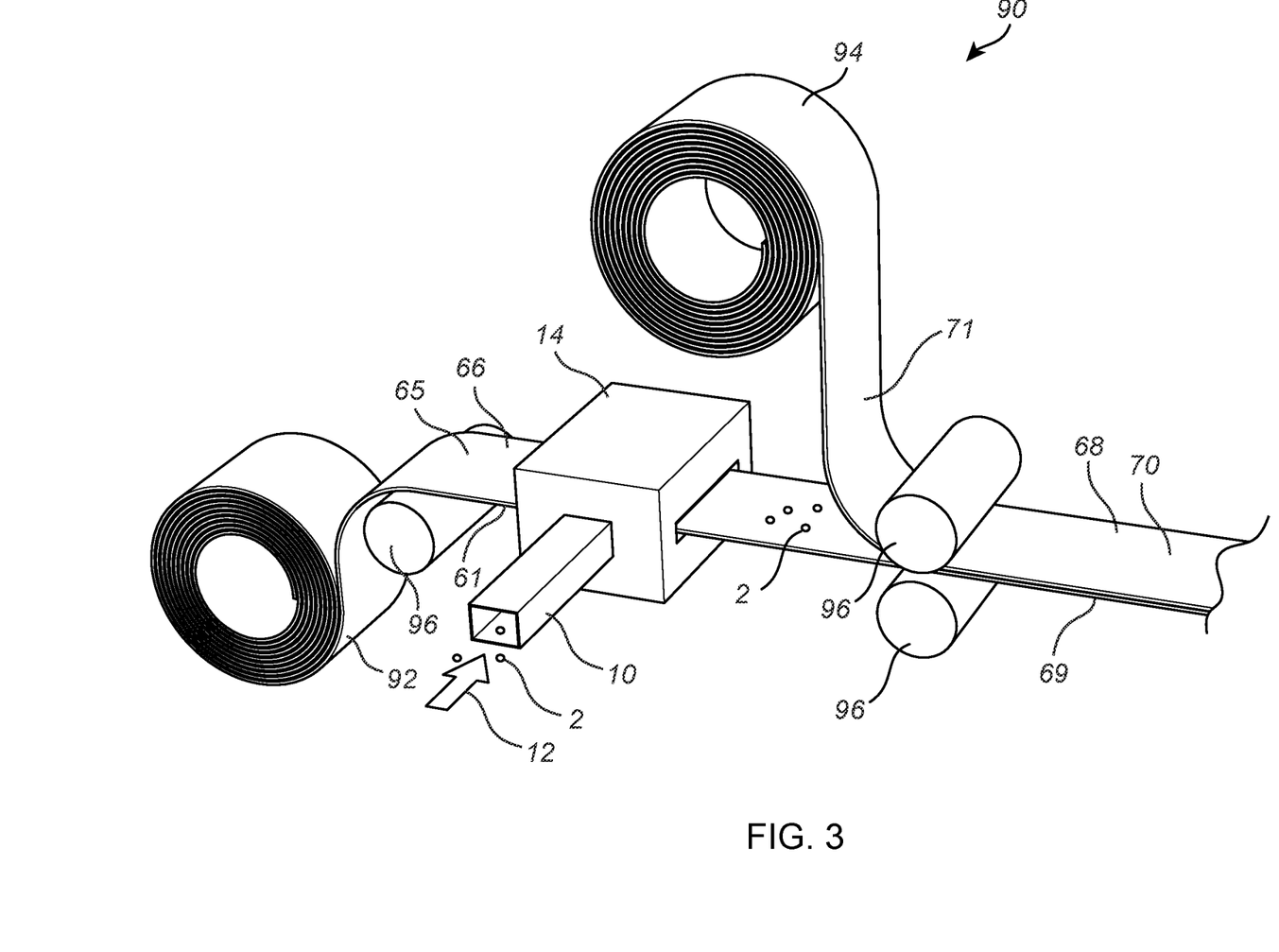
FIG. 3 illustrates an embodiment of a collector in which the substrate is in the form of a flexible tape.

FIG. 3 illustrates a collector 90 for collecting particles 2 in air, according to an embodiment of the inventive concept. This embodiment may utilize either the principle illustrated in FIG. 2A or the principle illustrated in FIG. 2B. In the present embodiment of a collector 90, the substrate 61 is a tape made of a flexible material, the tape being wound to a tape roll 92. The tape roll 92 is rotatably arranged such that when the tape is pulled, the tape will be rolled off of the tape roll 92. When the tape is arranged on the tape roll 92, the adhesive surface 66 is protected by the substrate 61 being in contact with a back side of the substrate 61 in an inner or outer portion of the roll.

Support cylinders 96 are used to support and guide the substrate 61 when rolled off of the tape roll 92. The end of the substrate 61 rolled off of the tape roll 92 is guided through a particle sampling chamber 14. Through a receiver 10 a flow of air 12 is guided into the particle sampling chamber 14. In the particle sampling chamber 14 particles 2 in the flow of air 12 may be collected onto the adhesive surface 66. It should be understood that the receiver 10 and the particle sampling chamber 14 are not necessarily part of the collector 90, but may be part of a device for detecting particles as will be described below.

The collector 90 further comprises a smoothing substrate 71, in the form of a tape made of a flexible material, the tape being wound to a smoothing substrate roll 94. The smoothing substrate roll 94 is rotatably arranged such that when the tape is pulled, the tape will be rolled off of the smoothing substrate roll 94. The smoothing substrate 71 is arranged to meet the adhesive surface 66 of the substrate 61 after a particle collection event has been completed. In the present embodiment two support cylinders 96 guide and push the substrate 61 and the smoothing substrate 71 together. In this manner, a sample carrier 70 having a smooth top surface 68 and a smooth bottom surface 69 may be provided.

It should be understood that the particle sampling chamber 14 may be large enough to house the entire arrangement of the collector 90 inside the particle sampling chamber 14.

By using the present collector 90 with an advancement mechanism pulling the substrates 61, 71, such as a roll-to-roll mechanism, the collector 90 may be used for sequential measurements where a new tape section is being pulled out from the tape roll 92 for each single particle collection event.

The collector 90 further facilitates such sequential measurements to be automated.

Figure 4:
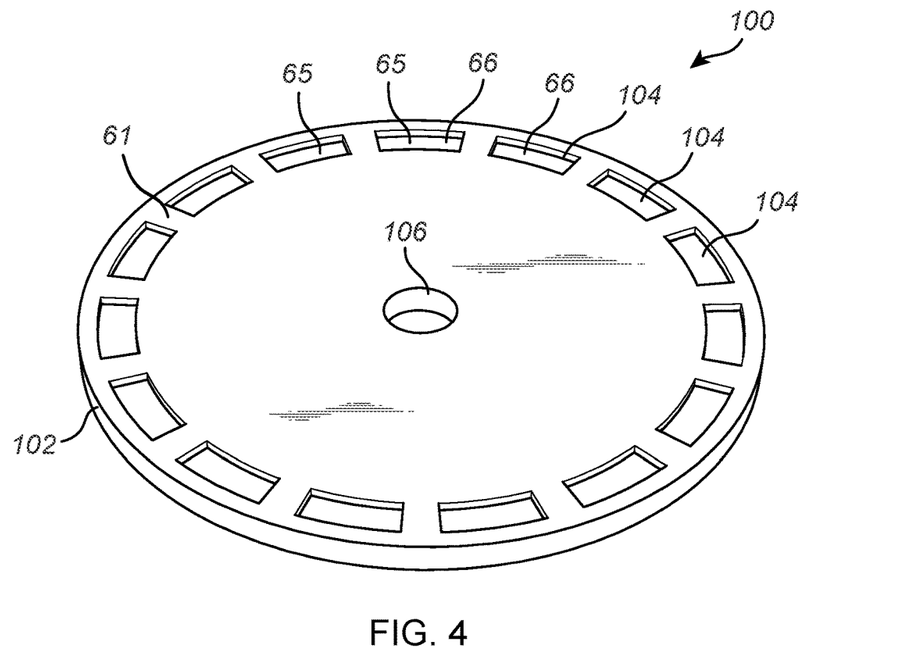
FIG. 4 illustrates an embodiment of a collector in which the substrate comprises a rotatable disk.

FIG. 4 illustrates a collector 100 for collecting particles 2 in air, according to an embodiment of the inventive concept. In the present embodiment of the collector 100, the substrate 61 comprises a rotatable disk 102. The disk 102 comprises a plurality of disk segments 104. Each disk segment 104 comprises a sample unit provided with an adhesive layer 65 with an adhesive surface 66 configured for a single particle collection event.

In the center of the disk 102 a through hole 106 is provided, which may be used for mounting the disk for rotational movement. This can be achieved by for example arranging the disk 102 such that a rotational shaft of a disk advancement mechanism is inserted through the through hole 106. The disk 102 may be arranged such that only a single disk segment 104 is located at a particle collection position at the same time. By rotation of such a shaft, one disk segment 104 may be transferred from the particle collection position and another disk segment 104, initially located outside the particle collection position, is transferred in to the particle collection position. In this manner, the collector 100 may be used for sequential measurements where each disk segment 104 is used for a single particle collection event. The collector 100 further facilitates such sequential measurements to be automated.

Figure 5:
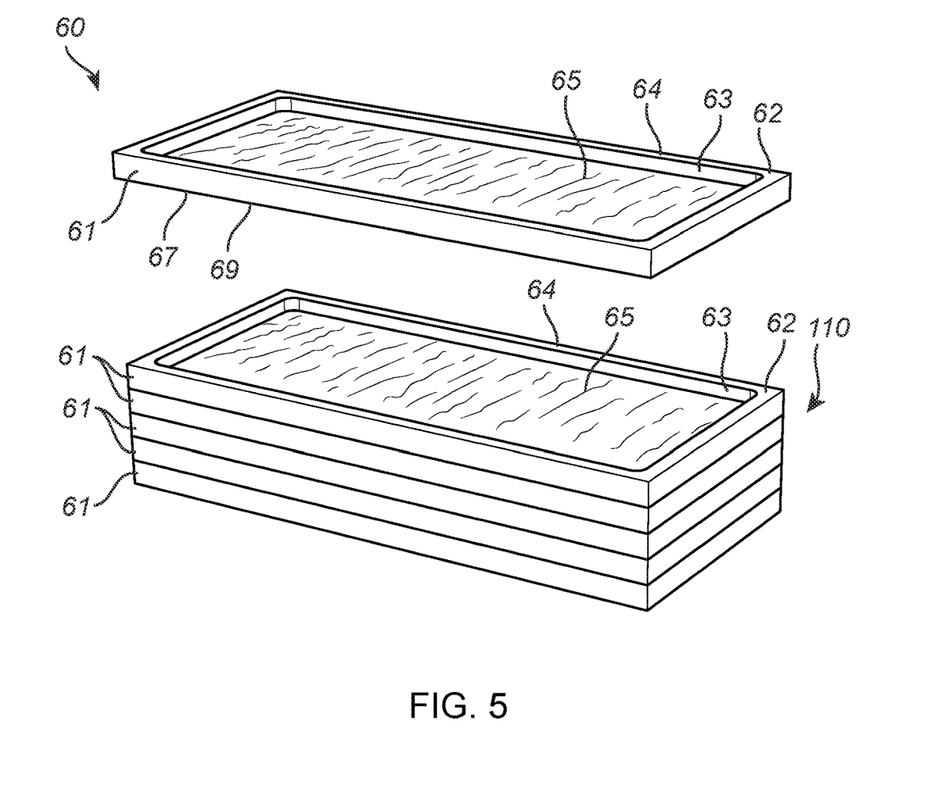
FIG. 5 illustrates a stack of collectors for collecting particles in air, according to an embodiment of the inventive concept.

FIG. 5 illustrates a stack 110 of substrates 61 for collecting particles 2 in air, according to an embodiment of the inventive concept. This alternative embodiment of the collector 60 largely shares the features and advantages as described in relation to FIG. 1. However, when the substrates 61 are arranged in a stack 110, there is no need for adding a protective film on each of the substrates 61, in order to provide them with protection elements 67. Instead, a collector side 62 of a first substrate 61 is provided with a protection element 67, by arranging a bottom surface 69 of a bottom side of a second substrate 61 on top of the first collector. In other words, the bottom surface 69 of the bottom side of the second substrate 61 constitutes the protection element 67 for the first substrate 61.

Since no extra material is required in order to provide protection elements 67, the present embodiment has the advantage that it may produce less waste material.

Another advantage is that a stack 110 allows to be loaded into an advancement mechanism, such as an eject-and-insert mechanism, configured for ejecting a substrate 61 from a particle collection position to a substrate take-up magazine, and to insert a subsequent substrate 61 from a substrate supply magazine, into the particle collection position. In this manner, the stack 110 may be used for sequential measurements where a new collector 60 is being loaded from the stack 110 for each single particle collection event. The stack 110 further facilitates such sequential measurements to be automated.

Figure 6:
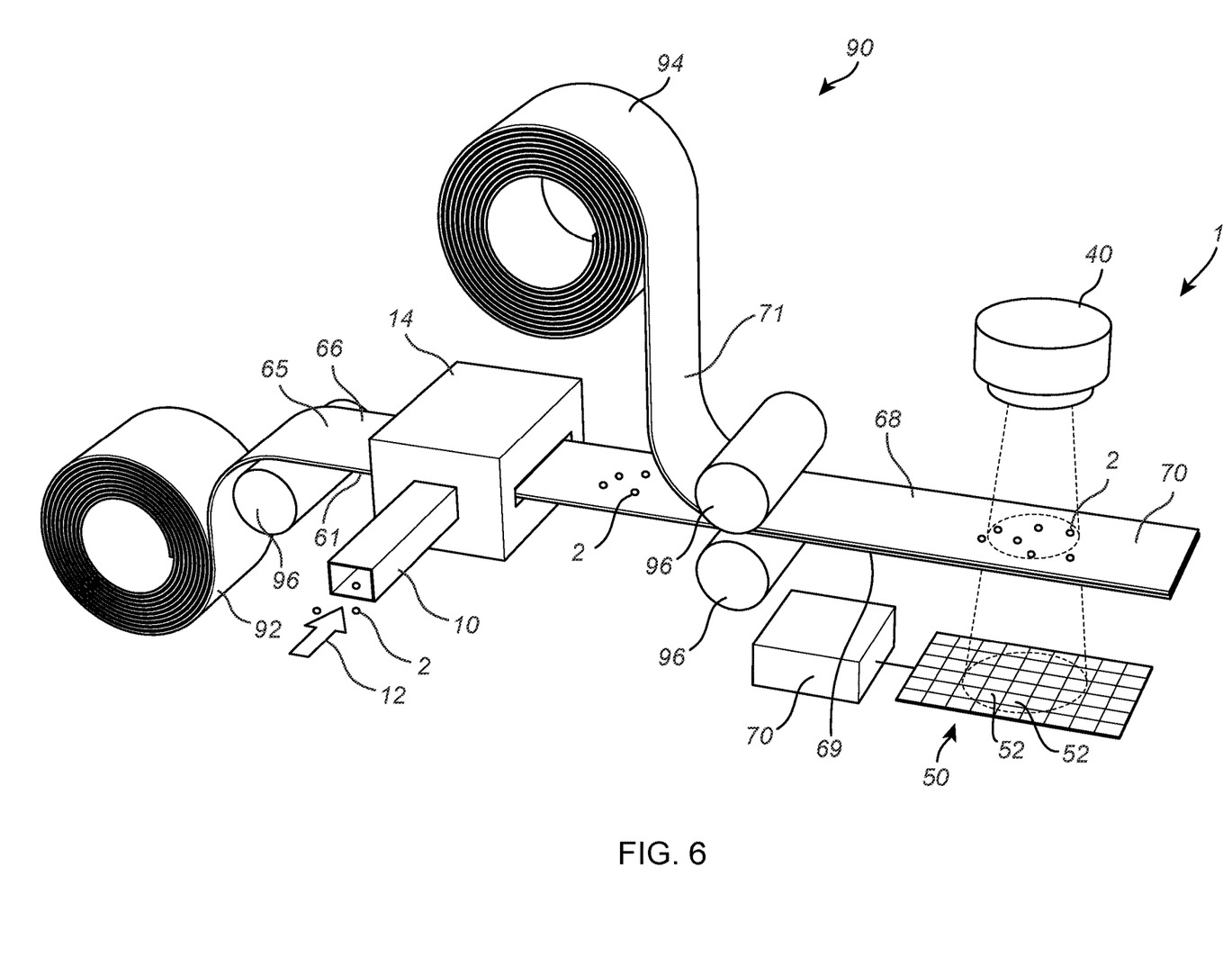
FIG. 6 illustrates a device for detecting particles in air based on in-line holographic imaging, according to an embodiment of the inventive concept.

FIG. 6 illustrates a device 1 for detecting particles in air, according to an embodiment of the inventive concept. The device 1 comprises a receiver 10 for receiving a flow of air 12, wherein the flow of air 12 comprises particles 2. The flow of air 12 enters a particle sampling chamber 14 via the receiver 10. The illustrated embodiment further comprises a collector 90. A tape roll 92 with a substrate 61 comprising an adhesive layer 65 is arranged to advance through the particle sampling chamber 14 in which at least some of the particles 2 in the flow of air 12 are collected onto an adhesive surface 66 of the adhesive layer 65. Thus, a particle collection event takes place.

The substrate 61, with the transferred particles 2, subsequently leaves the particle sampling chamber. The set of particles 2 collected on the substrate 61 may be all the particles 2 from the flow of air 12 or a subset of the particles 2 from the flow of air 12. The flow of air 12 may subsequently leave the particle sampling chamber via an outlet, at which the flow of air 12 may still contain some particles 2 that were not transferred to the substrate 61.

A smoothing substrate 71 from a smoothing substrate roll 94 is arranged to meet the adhesive surface 66 of the substrate 61 after a particle collection event has been completed. In the present embodiment two support cylinders 96 guide and push the substrate 61 and the smoothing substrate together. In this manner, a sample carrier 70 having a smooth top surface 68 and a smooth bottom surface 69 may be provided.

The device 1 further comprises a light source 40 configured to illuminate the set of particles 2 collected by the sample carrier 70. As the particles 2 are illuminated an interference pattern is formed on an image sensor 50, wherein the interference pattern is formed by interference between light being scattered by the set of particles and non-scattered light from the light source 40. The image sensor 50 comprises a plurality of photo-sensitive elements 52 configured to detect incident light. The image sensor 50 may herein be a charge-coupled device (CCD) or complementary metal-oxide-semiconductor (CMOS) camera.

In the illustrated arrangement a particle concentration relation between the concentration of particles in the flow of air 12 entering the receiver 10 and the number of particles collected onto the adhesive surface 66 on the substrate 61, and thus are collected on the sample carrier 70 imaged by the image sensor 50 may be set by for example the efficiency of the particle transfer and/or the volumetric flow rate of the air 12.

As illustrated in FIG. 6, the sample carrier 70 is configured to provide a light path from the light source 40 to the image sensor 50 through the top surface 68, through the adhesive layer 65, and through the bottom surface 69. This may be accomplished e.g. using transparent substrates 61, 71 as well as a transparent adhesive material. In the illustrated embodiment, the non-scattered light from the light source 40, i.e. the reference light, is passed along a common optical path with the light being scattered by the particles 2, i.e. the object light. Thus, the interference pattern is formed within a wavefront passing the particles 2 and the sample carrier 70 in a so-called in-line holography set-up.

In FIG. 6 the image sensor 50 is connected to a processor 120 configured to perform digital holographic reconstruction on the interference pattern detected by the image sensor 50 to generate an image of the set of particles 2. Any suitable algorithm for performing the digital holographic reconstruction may be used, as known to the person skilled in the art, including a Gerchberg-Saxton algorithm or multi-acquisition (multi-depth and/or multi-wavelength) for phase retrieval, or reconstruction based on angular spectrum diffraction by means of Gabor wavelet transform. The processor 120, or another processor, may then identify particles 2 in the image and subsequently count the identified particles 2.

The processor 120 may be implemented as a processing unit, such as a central processing unit (CPU), which may execute the instructions of one or more computer programs in order to implement functionality of the processor 120.

The processor 120 may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement functionality of the processor 120.

A surface concentration of particles 2 in the sample carrier 70 may be calculated from the counted number of particles 2 in the image and the surface area of the sample carrier 70 that the illumination from the illumination source 40 and the image sensor 50 jointly cover. However, a surface concentration of particles may be calculated from the counted number of particles 2 in a plurality of images to achieve a statistically accurate result.

The surface concentration of particles 2 may subsequently be used to determine a concentration of particles 2 in the flow of air 12, corresponding to the concentration in the air at the receiver 10 of the device 1. The concentration of particles 2 in the flow of air 12 may be calculated based on the surface concentration of particles 2 based on one or more of the sample carriers 70 and the particle concentration relation.

As the SNR of the detected interference pattern may decrease with increasing distance between the image sensor and the scattering particle 2, it may be advantageous if the distance between the set pf particles 2 collected in the sample carrier 70 and the image sensor 50 is below a distance threshold. It should therefore be understood that it may be advantageous with a sample carrier 70 close to the image sensor 50, e.g. in immediate proximity of the image sensor. It should be understood that in this respect FIG. 3 and FIG. 6 should be interpreted as schematic illustrations, wherein the sample carrier 70 is illustrated some distance away from the image sensor 50 for the sake of clarity.

The embodiments of the inventive concept presented above may be applied for a number of different purposes aiming at monitoring particles in interior and exterior air. The particles may be any type of air-borne particulate matter such as pollen, dust, soot, air-borne bacteria, or fungi. There is provided a collector for collecting particles in air and a device for detecting particles in air and determining if the collected particles are particles of interest. The concept allows a high measurement frequency and has a potential of performing automated measurements. Further, it may be capable of classifying or determining the type of particle collected.

Outdoor applications may be monitoring of exterior air quality for detection of pollen, dust, soot, or other pollutants.

According to an embodiment, a device for detecting pollen in air is provided. Thanks to the present inventive concept, pollen levels in exterior air may be monitored with a high frequency, and with the potential of performing automated measurements. It may also provide measurement stations at a low cost, which may lead to an increased number of measurement stations. This in turn may have the potential of providing more up-to-date and geographically more precise information on pollen levels in exterior air, which may be valuable to people that are affected by pollen allergies.

Indoor applications may be monitoring interior air quality for detection of molds, fungi, pollen, dust, or bacteria. Such monitoring can be applied in a variety of locations, such as public shopping malls, hospitals or laboratories.

Monitoring of air-borne bacteria may be of particular importance in aseptic environments, such as the manufacturing environment for pharmaceutical production. Monitoring of air-borne bacteria in interior air may be required to ensure a sterile manufacturing environment.

Presence of bacteria in the manufacturing environment of pharmaceutical products may contaminate the products and force the products manufactured in a contaminated environment to be disposed. Thus, early detection of presence of bacteria may be highly advantageous, because if production in a contaminated environment is continued, a large quantity of products may have to go to waste.

According to an embodiment, a device for detecting bacteria in air is provided. Thanks to the present inventive concept, bacterial levels in interior air may be monitored with a high frequency, and with the potential of providing results in real-time. As soon as bacterial levels are detected, the production may be stopped such that no or very little of the pharmaceutical products will go to waste.

Moreover, the real-time aspect of the present inventive concept further allows for monitoring of development of bacterial levels over time, by acquiring time sequences of measurements. In this manner bacterial growth may be studied.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A collector for collecting particles in air, said collector comprising:
   a substrate, which is transparent to allow imaging of the particles through the substrate, wherein a collector side of the substrate comprises a recess area and a protection area surrounding the recess area;
   an adhesive layer arranged in the recess area on the collector side of the substrate, said adhesive layer being formed by a transparent adhesive material;
   a protection element, which is configured to protect the adhesive layer before collection of particles, wherein the protection element is arranged in contact with the protection area of the collector side of the substrate covering the recess area such that the protection element is physically spaced from the adhesive layer;
   wherein the collector is configured to allow release of protection of the adhesive layer by the protection element to expose a smooth adhesive surface of the adhesive layer to ambient air for collecting particles on the adhesive surface; and
   wherein the collector is further configured as a transparent particle sample carrier having the exposed smooth adhesive surface for preventing light from being diffusely scattered by the transparent particle sample carrier.

2. The collector according to claim 1, wherein the protection element is a protective film arranged on the collector side of the substrate such as to protect the adhesive surface of the adhesive layer from exposure to ambient air.

3. The collector according to claim 1, wherein the substrate forms a single sample unit configured for a single event of collecting particles on the adhesive surface.

4. A device for detecting particles in air; said device comprising:
   a receiver for receiving a flow of air comprising particles;

a particle sampling chamber configured to receive the flow of air, the particle sampling chamber comprising a collector according to claim 1, wherein the collector is arranged for collecting a set of particles from the flow of air on the adhesive surface of the collector;

a light source configured to illuminate the particles collected on the adhesive surface, such that an interference pattern is formed by interference between light being scattered by the particles and non-scattered light from the light source;

an image sensor comprising a plurality of photo-sensitive elements configured to detect incident light, the image sensor being configured to detect the interference pattern.

5. The device according to claim 4, wherein the light source is configured to emit at least partially coherent light.

6. The device according to claim 4, further comprising a substrate advancement mechanism configured to transfer the substrate of the collector or a part of the substrate of the collector used for collection of particles, from a particle collection position, and introducing a new substrate of the collector or a new part of the substrate of the collector into the particle collection position for use in collecting a subsequent set of particles.

7. The device according to claim 4, wherein:

the light source is arranged at a first side of the transparent particle sample carrier; and the image sensor is arranged at a second side of the transparent particle sample carrier, wherein the second side of the transparent particle sample carrier is opposite to the first side of the transparent particle sample carrier;

wherein the light source, the transparent particle sample carrier and the image sensor are further arranged to provide a light path from the light source to the image sensor through the transparent particle sample carrier and through the surface of the transparent particle sample carrier with the collected set of particles.

8. The device according to claim 4, further comprising a processor configured to perform digital holographic reconstruction on the interference pattern detected by the image sensor to generate an image of the set of particles.

9. The device according to claim 8, the processor being further configured to:

compare the image of the set of particles to one or more characteristics of particles to identify the particles in the image.

* * * * *